No. 646,469. Patented Apr. 3, 1900.
C. W. SLEEPER.
CAN CAPPING MACHINE.
(Application filed Oct. 12, 1899.)
(No Model.) 5 Sheets—Sheet 1.
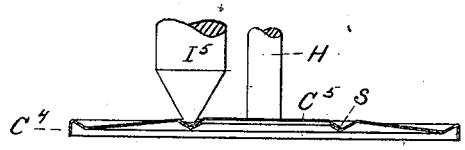
Fig. 8.
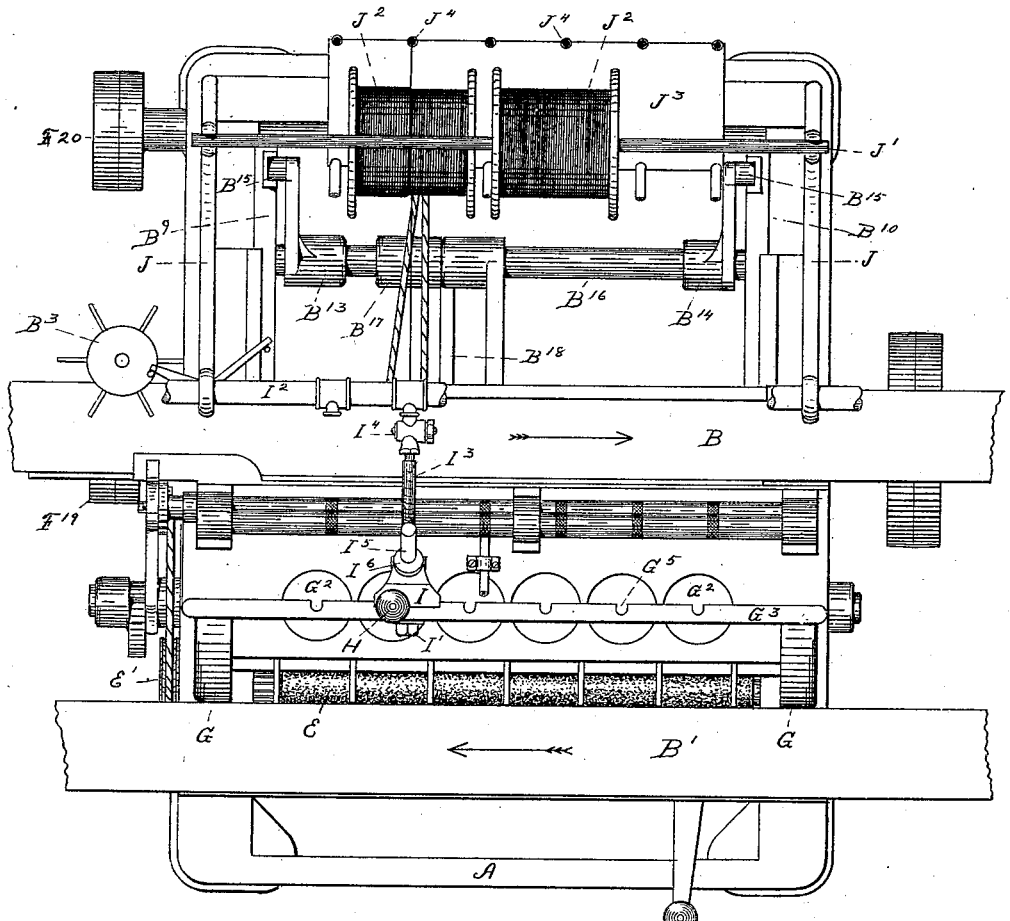
Fig. I.
Witnesses.
Ralph W. Foster
Waterman L. Williams
Inventor.
Charles W. Sleeper
by his attorney
Charles Reed No. 646,469. Patented Apr. 3, 1900.
C. W. SLEEPER.
CAN CAPPING MACHINE.
(Application filed Oct. 12, 1899.)
(No Model.) 5 Sheets—Sheet 2.

Witnesses. Inventor.

No. 646,469. Patented Apr. 3, 1900.
C. W. SLEEPER.
CAN CAPPING MACHINE.
(Application filed Oct. 12, 1899.)

(No Model.) 5 Sheets—Sheet 3.

Fig: 3.

No. 646,469. Patented Apr. 3, 1900.
C. W. SLEEPER.
CAN CAPPING MACHINE.
(Application filed Oct. 12, 1899.)
(No Model.) 5 Sheets—Sheet 4.

Witnesses.
Ralph W. Foster
Waterman L. Williams

Inventor.
Charles W. Sleeper
by his attorney
Charles W. Reed

No. 646,469. Patented Apr. 3, 1900.
C. W. SLEEPER.
CAN CAPPING MACHINE.
(Application filed Oct. 12, 1899.)
(No Model.) 5 Sheets—Sheet 5.

Witnesses.
Ralph W. Foster
Waterman L. Williams

Inventor.
Charles W. Sleeper
by his attorney

UNITED STATES PATENT OFFICE.

CHARLES W. SLEEPER, OF LANCASTER, NEW HAMPSHIRE, ASSIGNOR TO THE SLEEPER MACHINE COMPANY, OF MAINE.

CAN-CAPPING MACHINE.

SPECIFICATION forming part of Letters Patent No. 646,469, dated April 3, 1900.

Application filed October 12, 1899. Serial No. 733,367. (No model.)

*To all whom it may concern:*

Be it known that I, CHARLES W. SLEEPER, of Lancaster, in the county of Coos and State of New Hampshire, have invented a new and useful Improvement in Can-Capping Machines, of which the following, taken in connection with the accompanying drawings, is a specification.

My invention relates to improvements in that class of can-capping machines in which the filled cans, with caps in position upon their tops, are placed upon revolving disks and while revolving are brought into contact with heated soldering-irons against which a wire of solder is fed and the wire thereby melted into the seam formed by the cap and the circular groove in the can-top.

It consists, essentially, in means for separating the cans into sets of the number to be soldered at one time, means for feeding each set of cans into the machine and placing them upon revolving disks by which they are made to rotate during the process of soldering, means for bringing the rotating cans into contact with the soldering-irons, means for supporting and heating the soldering-irons, means for fluxing and feeding the wire solder, and means for removing the soldered cans from the machine after the operation of soldering is completed.

Figure 2:
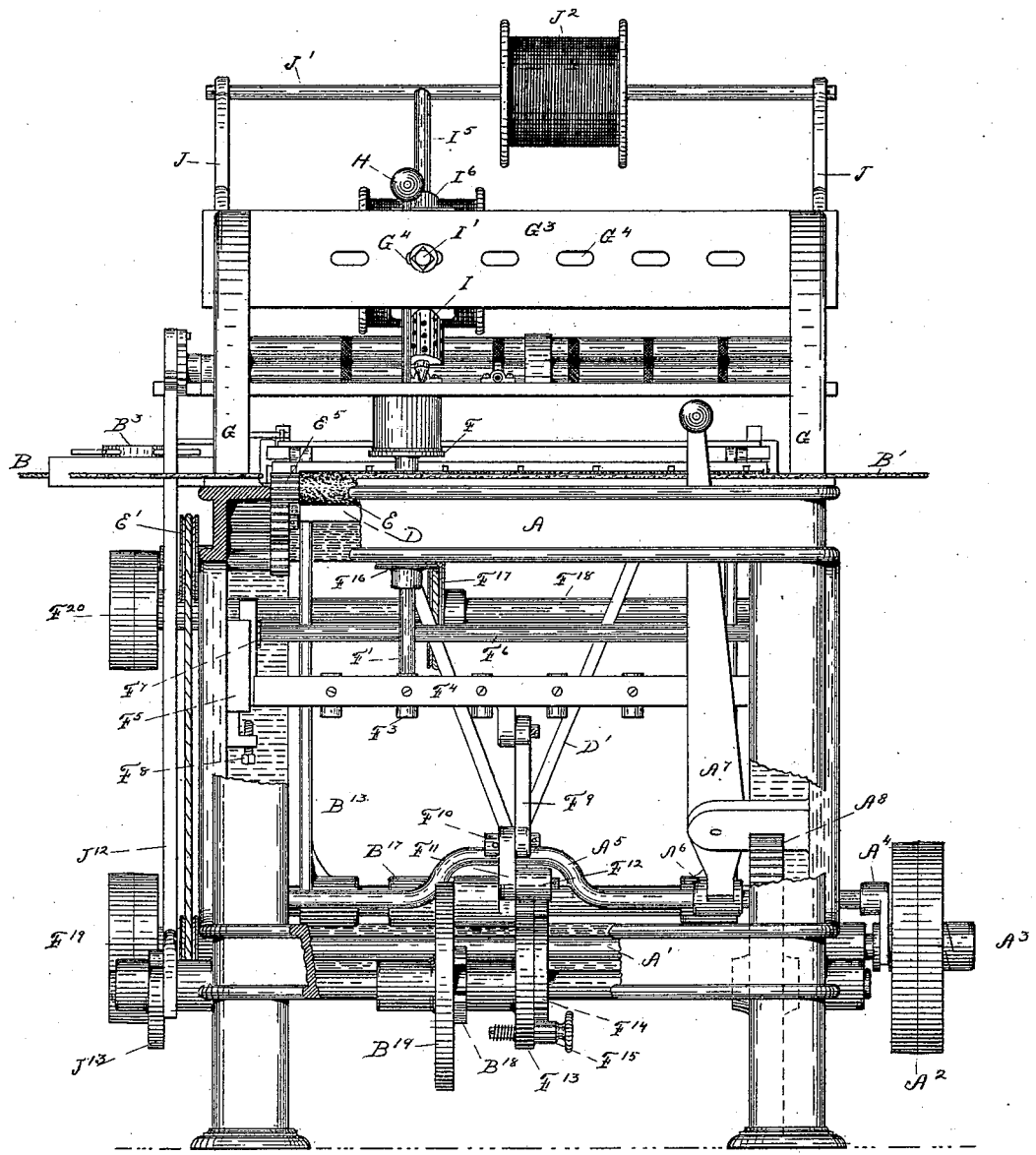
Figure 3:
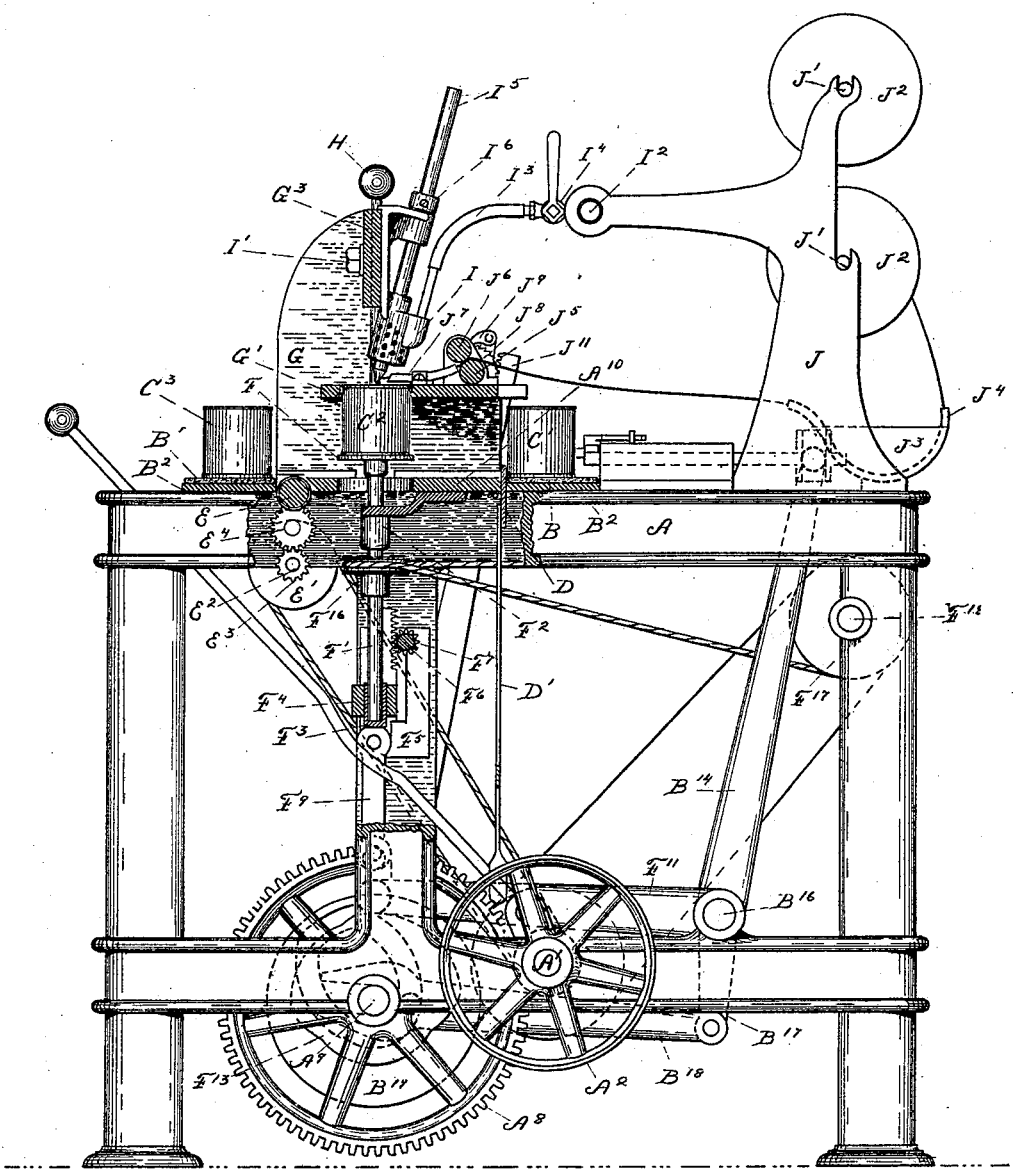
Figure 4:
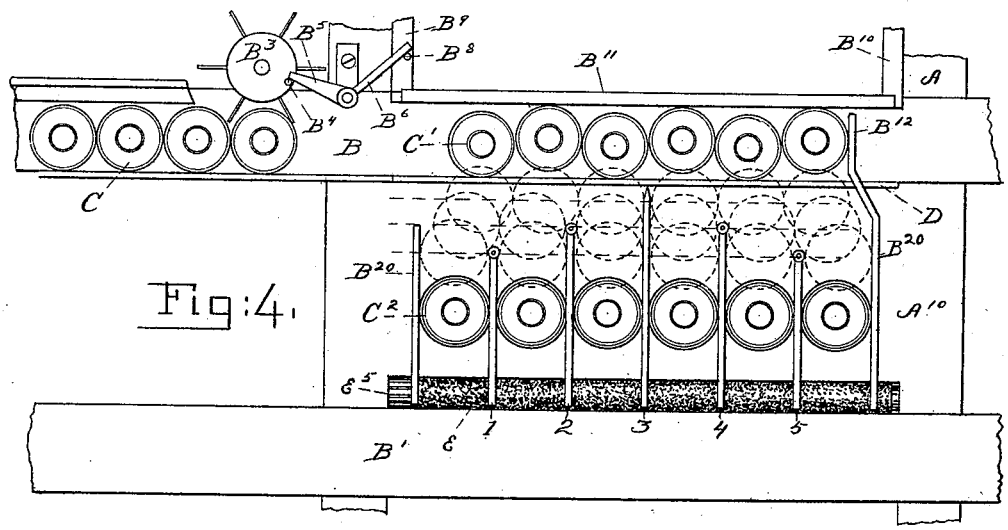
Figure 5:
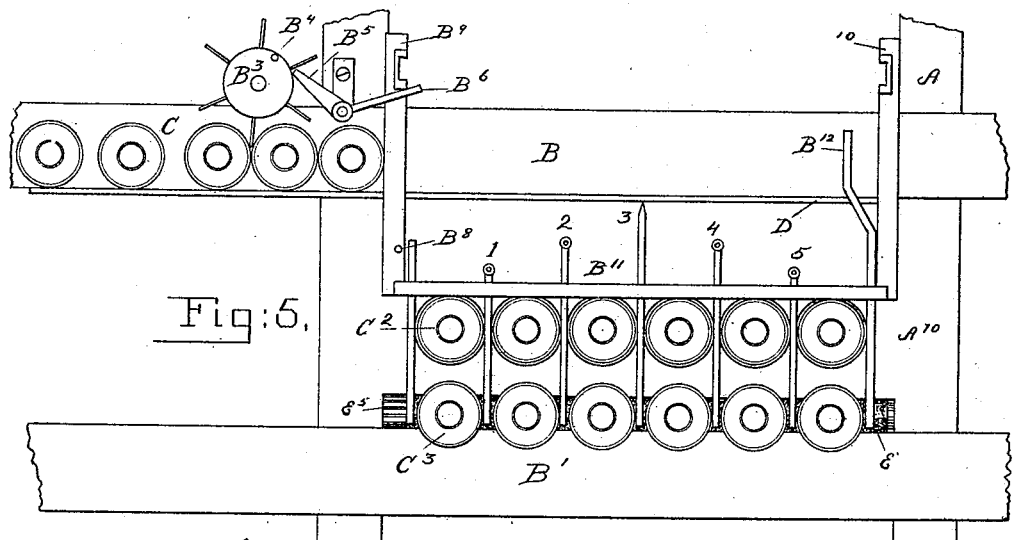
Figure 6:
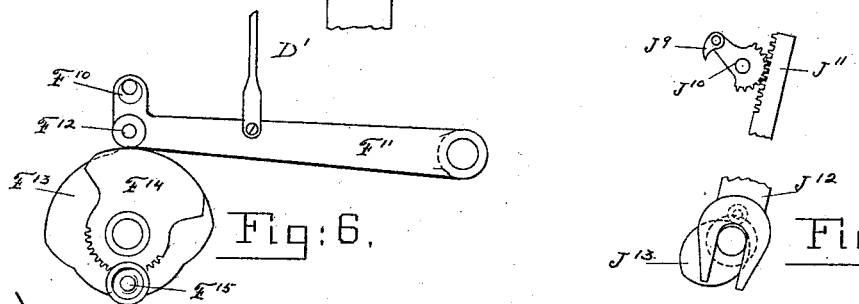
Figure 7:
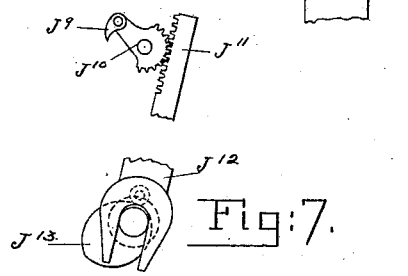
Figure 9:
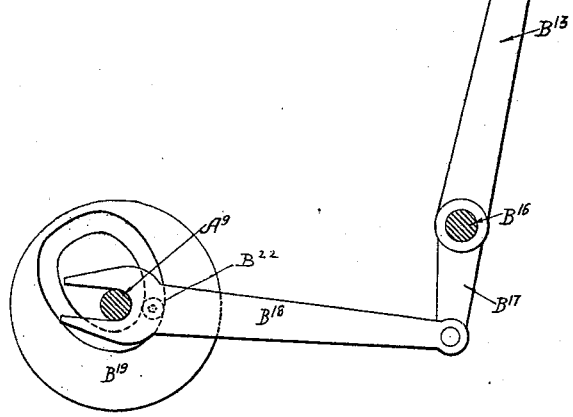
Figure 10:
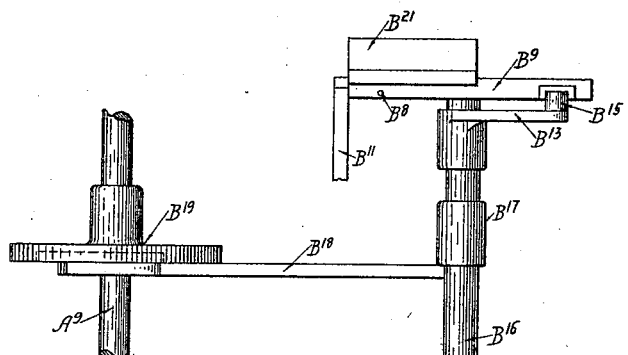

Figure 1 is a top view of my machine. Fig. 2 is a front view of same with portions of the frame cut away to show details of construction. Fig. 3 is an end view of same with portions of the frame cut away and some of the parts shown in section, the sections being severally taken where they will best show the construction and not indicated upon the other drawings. Figs. 4 and 5 are details showing the manner of separating the cans into sets and placing the sets upon the revolving disks. Fig. 6 is a detail showing cam and cam-lever for raising the revolving disks. Fig. 7 is a detail showing solder-feed cam, cam-rod, and pawl-carrying arm. Fig. 8 is an enlarged detail showing can-head and cap with soldering-iron and cap-holding spindle in position for soldering. Figs. 9 and 10 are enlarged details showing the cam movement for operating the feed-slide.

The drawings show a machine for capping cans in sets of six. It will be understood that a machine may be constructed to cap sets of any convenient number without departing from the spirit of my invention.

In Figs. 1 and 2 I have shown only the parts necessary to handle one can of the set, with provision for applying the parts necessary to enable the machine to handle a full set. A is a frame supporting the several parts of the machine. A' is a shaft, and $A^2$ a clutch-pulley to receive a driving-belt. $A^3$ is a clutch operated by a shipper $A^4$ and a shipper-rod $A^5$, carrying a collar $A^6$, engaged by a hand-lever $A^7$. The shaft A' carries a pinion (not shown) which engages a gear $A^8$ upon the cam-shaft $A^9$. B B' are endless belts having continuous motion in the direction of the arrows, Fig. 1, and resting upon plates $B^2$ $B^2$, secured to the top of frame A.

I do not show or claim any special means for moving the belts B B', as the means would necessarily vary with differing conditions and do not constitute a part of my invention.

Referring to Figs. 4 and 5, $B^3$ is a turnstile having as many arms as there are cans in a set to be soldered and provided with a stop-pin $B^4$, engaged by a pawl $B^5$, which is provided with an arm $B^6$, engaged by a pin $B^8$ upon the slide $B^9$. The slide $B^9$ is rigidly connected to a similar slide $B^{10}$ by a feed-bar $B^{11}$, the three parts $B^9$, $B^{10}$, and $B^{11}$ constituting a "feed-slide" for pushing the cans into the machine. C C' $C^2$ $C^3$ are sets of cans in different positions in the machine, showing the relative position of each set at different stages of the operation. These cans are usually provided with heads similar to $C^4$, Fig. 8, stamped with an annular groove around the center opening, into which groove the flange of the cap $C^5$ fits, leaving an annular depression or groove S, which is called the "seam." The filled cans are placed upon the belt B either by hand or by the filling machinery and are brought by the belt to position C, where they are stopped by the turnstile $B^3$. When the feed-slide moves forward, the turnstile is set free by the pawl $B^5$ and allows the cans to advance until they strike the slide $B^9$, Fig. 5. When the feed-slide returns to position shown in Fig. 4, the pin $B^8$ again engages the pawl, which engages the pin $B^4$ upon the turnstile and stops it. In the meantime a full set of cans will have passed the turnstile and advanced to position $C'$, where they are stopped by the bar $B^{12}$ and remain between the bar $B^{11}$ and the gate D. (Shown also in Figs. 2 and 3.) The gate D is provided with a yoke $D'$ and is guided between the sides of the frame A and is raised and lowered by the cam-lever $F^{11}$, operated by the cam $F^{13}$, Fig. 6. The feed-slide is operated by two arms $B^{13}$ $B^{14}$, provided with rollers $B^{15}$ $B^{15}$, which engage vertical slots in the slides $B^9$ $B^{10}$. The arms $B^{13}$ $B^{14}$ are secured to a rock-shaft $B^{16}$, which carries an arm $B^{17}$, connected to a cam-rod $B^{18}$, which is moved by a grooved cam $B^{19}$, engaging a pin and roller $B^{22}$ upon the side of the cam-rod $B^{18}$, as shown in Figs. 3 and 9. Just before the feed-slide moves forward, Figs. 4 and 5, the gate D drops, allowing the set of cans $C'$ to be pushed from the belt B to and upon the plate $A^{10}$, and as the cans move forward to position $C^2$ they are separated by the bars 1 2 3 4 5, acting in conjunction with the guide-bars $B^{20}$, as indicated by three sets of dotted circles. The bars 1 2 4 5 carry small rollers upon their ends to relieve the cans from friction against the bars. The advancing set of cans $C'$ strikes the set of finished cans $C^2$ and pushes them upon the roll E, which moves them forward to and upon the belt $B'$, which carries them away from the machine.

The roll E should be covered with rubber, leather, or some similar yielding material, and its upper surface should be slightly above the top of plate $A^{10}$. It is driven by a pulley upon shaft $A'$, belted to a pulley $E'$ upon a shaft $E^2$, which carries a gear $E^3$, engaging an idle gear $E^4$, which engages a gear $E^5$ upon the end of the roll E.

While the cans are in position $C^2$ they rest upon a set of revolving disks F, Figs. 2 and 3. Each disk is secured to a vertical spindle $F'$, journaled in an arm $F^2$, secured to plate $A^{10}$, and in a step $F^3$, adjustably secured in a bar $F^4$. The bar $F^4$ has upwardly-projecting ends fitting suitable guides $F^5$, secured to the frame A.

$F^6$ is a shaft journaled at each end in the guides $F^5$ and provided with two gears $F^7$, which engage rack-teeth in the upwardly-projecting ends of bar $F^4$ and serve to keep the bar $F^4$ in horizontal alinement with the plate $A^{10}$. Screws $F^8$ in the guides $F^5$ serve to stop the bar $F^4$ when the disks F descend to the level of the top of plate $A^{10}$. A link $F^9$ connects the bar $F^4$ with an eccentric-pin $F^{10}$, Fig. 6, in the end of a lever $F^{11}$, pivoted upon shaft $B^{16}$, and a roller $F^{12}$, which rests upon a three-step cam $F^{13}$. The cam $F^{13}$ is provided with a segment $F^{14}$, which may be moved by a hand-gear $F^{15}$, engaging teeth in the segment $F^{14}$. By moving said segment the working face of cam $F^{13}$ may be made longer or shorter, as required. The spindle $F'$ is driven by a belt over pulleys $F^{16}$ $F^{17}$, and shaft $F^{18}$, upon which pulley $F^{17}$ is secured, is driven by a belt over pulleys $F^{19}$ $F^{20}$. (Shown in Fig. 1.)

G G, Figs. 1, 2, and 3, are standards upon plate $A^{10}$.

$G'$ is a plate secured between the standards G G and has a series of holes $G^2$ for the reception of the cans bored through it in vertical alinement with the spindles $F'$ and of a little larger diameter than the can-heads. These holes $G^2$ are chamfered at their lower ends in order to permit the cans as they are raised to enter them more easily, and also in case the axes of the cans as they rest on the disks are not in exact alinement with the spindles to force them into that position.

$G^3$ is a bar connecting the standards G G and provided with a series of slots $G^4$, adapted for the reception of bolts attached to the soldering-iron holders I and with a series of vertical grooves $G^5$, Fig. 1, which are in alinement with the spindles $F'$ and are adapted to receive the weighted spindles H.

H is a weighted spindle fitting loosely the groove $G^5$ and is designed to rest upon the cap of the can and hold it down during the process of soldering.

I is a soldering-iron holder adjustably secured to the bar $G^3$ by a bolt $I'$, passing through the slot $G^4$. The lower end of holder I is enlarged, so as to form a heating-chamber, the walls of which are perforated to permit of a proper combustion of gas, which is admitted to it from a supply-pipe $I^2$ through the tube $I^3$ and controlled by a cock $I^4$.

The soldering-iron $I^5$ terminates in a blunted point, which should be of such size and shape as to permit it to enter the seam and touch both its sides, but not to touch the bottom of the seam, as in that case there would be danger of burning the contents of the can. It is fitted loosely in the holder I, so as to allow the point of the iron to follow any irregularities in the movement of the seam, and is furnished with an adjustable set-collar $I^6$, by which its vertical position in the holder and its distance from the can-carrying disk may be regulated. Except during the operation of soldering this collar rests upon the top of the holder I and so holds the soldering-iron suspended in the holder.

J J are standards supporting shafts $J'$, which carry the reels of solder $J^2$.

$J^3$ is a flux-pan filled with a liquid flux, (usually a solution of resin in some solvent.)

$J^4$ are tubes secured to the flux-pan and passing through the flux, being perforated to allow the flux to enter inside the tubes. The wire solder from reel $J^2$ passes through the tube $J^4$ and becomes coated with the flux and is then fed between the feed-rolls $J^5$ $J^6$ and through the tubular guide $J^7$ to the side of the soldering-iron. The flux carried by the wire causes it to melt quickly and flow freely down into the seam S, where it is distributed by the soldering-iron as the can revolves.

The feed-roll $J^5$ is provided with a ratchet $J^8$, which is moved by a pawl $J^9$, carried by a segment-arm $J^{10}$, Fig. 7, engaged by a rack $J^{11}$ upon the end of the cam-rod $J^{12}$, which is given reciprocating motion by a cam $J^{13}$, acting upon a pin and roller carried by the cam-rod.

As the revolving can is raised by the spindle $F'$ it enters the hole $G^2$ in plate $G'$. The can-cap strikes the weighted spindle H and raises it, and the seam S encounters the end of the soldering-iron $I^5$ and raises it until the collar $I^6$ clears the holder I. The roller $F^{12}$ will then be upon the highest step of cam $F^{13}$, Fig. 6. By moving the eccentric-pin $F^{10}$ in the lever $F^{11}$ the extent of the upward movement of the disk F may be varied and the machine be adjusted for use on cans of different heights. The solder should commence feeding as the soldering-iron meets the seam and continue feeding during a full revolution of the can, which should make from two to four revolutions with the point of the iron resting upon the seam. The roller $F^{12}$ on the lever $F^{11}$ then drops to the middle step of cam $F^{13}$, at which point the soldering-iron should clear the seam. The spindle H should still rest upon the cap to hold it down while the solder hardens. The roller $F^{12}$ then reaches the third step of the cam $F^{13}$, thereby causing the can to descend until the bar $F^4$ rests upon the adjusting-screws $F^8$, when the next set of cans $C'$ will be fed forward.

What I claim, and desire to secure by Letters Patent, is—

1. In a can-capping machine the turnstile $B^3$ having a stop-pin $B^4$, in combination with the pawl $B^5$, endless belt B and stop-bar $B^{12}$ and means for operating said pawl and belt, substantially as described.

2. In a can-capping machine the turnstile $B^3$ having a stop-pin $B^4$, in combination with the pawl $B^5$ with its arm $B^6$, pin $B^8$, reciprocating feed-slide $B^9$, $B^{10}$, $B^{11}$, endless belt B, stop-bar $B^{12}$ and means for operating said feed-slide and belt, substantially as described.

3. In a can-capping machine the reciprocating feed-slide $B^9$, $B^{10}$, $B^{11}$ and gate D with means for operating the same, in combination with the separator-bars 1, 2, 3, 4, 5, guide-bars $B^{20}$, and means for supporting the can to be operated upon, substantially as described.

4. In a can-capping machine the separator-bars 1, 2, 3, 4, 5, guide-bars $B^{20}$, and disks F in combination with means for forcing the cans to be soldered between said bars to and upon said disks, substantially as described.

5. In a can-capping machine the can-carrying disks F, each provided with a spindle $F'$, in combination with the plate $G'$, having conical openings $G^2$ and means for rotating said spindles and raising and lowering the same, substantially as described.

6. In a can-capping machine the weighted spindles H, each capable of free vertical motion and adapted to rest by its own weight upon the can-head during the process of soldering, in combination with the plate $G'$ having openings $G^2$ adapted to receive and embrace the periphery of the can-head and the revoluble can-carrying disks F and mechanism for rotating said disks and raising and lowering the same substantially as described.

7. In a can-capping machine the soldering-irons $I^5$ each suspended loosely in an adjustable holder I and capable of vertical and lateral movement independently of said holder, in combination with the perforated plate $G'$, revoluble can-carrying disks F and means for rotating and for raising and lowering said disks substantially as described.

8. In a can-capping machine a flux-pan $J^3$ for containing a liquid flux, and perforated guide-tubes $J^4$ in said pan with means for drawing a continuous wire of solder through said guide-tubes and feeding the fluxed solder against the soldering-iron, substantially as described.

9. In a can-capping machine the revoluble disks F having spindles $F'$ and means for revolving the same, in combination with the supporting-bar $F^4$ having steps $F^3$, guides $F^5$, means for preserving the horizontal alinement of said supporting-bar, and means for giving to said bar a reciprocating vertical motion, substantially as described.

10. In a can-capping machine the reciprocating feed-slide $B^9$, $B^{10}$, $B^{11}$, bed-plate $A^{10}$, separator-bars 1, 2, 3, 4, 5, guide-bars $B^{20}$, disks F, roll E and endless belt $B'$ with means for operating said parts respectively, so combined and arranged that each set of cans after being soldered is pushed by the set of cans next succeeding upon the belt $B'$ and carried by said belt away from the machine, substantially as described.

In testimony whereof I have signed my name to this specification, in the presence of two subscribing witnesses, on this 29th day of September, A. D. 1899.

CHARLES W. SLEEPER.

Witnesses:
O'NEIL TWITCHELL,
ROLLIN J. BROWN.